Patented Jan. 21, 1947

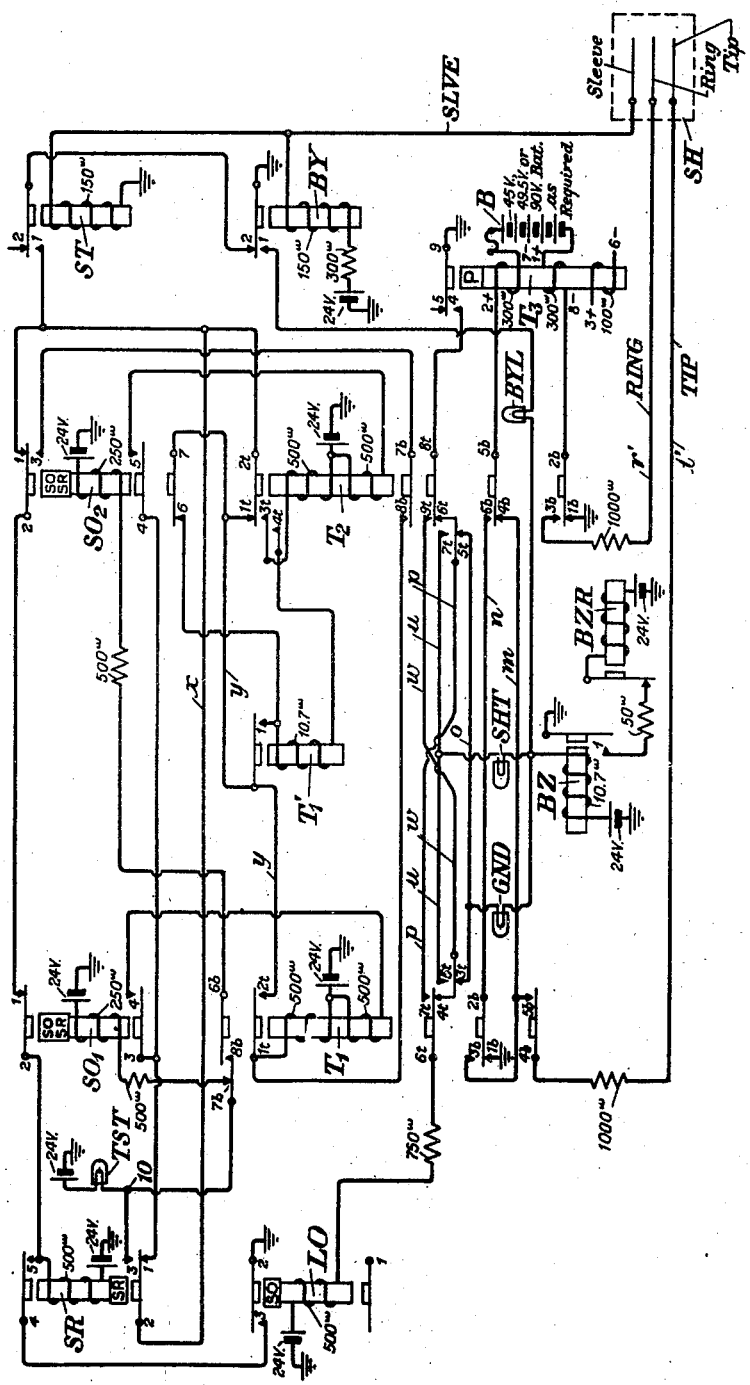

2,414,612

UNITED STATES PATENT OFFICE 2,414,612

TESTING INSULATION

Claude M. Ross, Mitchell, S. Dak., assignor to American Telephone and Telegraph Company, a corporation of New York Application October 18, 1944, Serial No. 559,143

7 Claims. (Cl. 179—175.3)

This invention relates to testing apparatus and methods, and particularly to apparatus and methods for testing insulation in connection with cables, drop wires leading from a line to a subscriber's premises, or insulation occurring elsewhere in the telephone plant.

The testing set of the present invention is particularly adapted to measure the line insulation of subscribers' lines during and after wet weather. If, due to poor insulation, the leakage to ground or from one wire to the other is greater than an allowable value, an indication of this fact will be given by the set. Preferably the set is designed so that it will make tests of tip-to-ground leakage, ring-to-ground leakage, and tip-to-ring leakage. If any one of these leakages exceeds an allowable value, the fact may be noted and steps taken to locate the cause of the defect and correct it.

Another feature of the test set of the present invention is that for each line it will automatically make the three tests above mentioned in regular successive order without any circuit manipulated by the operator. All the operator has to do is to note certain signals in testing a given line, and record their meaning. The beginning and end of the test is indicated either visually or audibly, or both, and after a given line is tested the operator shifts the contact shoe used to make contact with the line to the next line to be tested.

Preferably the test set of the invention performs the following functions:

(a) It provides visual or audible signals, or both, if the line to which it is connected is busy.

(b) If the line tests busy, the circuit of the set is so arranged that it will not cause interference with the busy line.

(c) While testing an idle line, the set renders the line busy to all calls.

(d) It makes accurately timed and uniform tests of the leakage to ground from each side of the line, and of the leakage between wires.

(e) It produces visual or audible signals, or both, if the insulation resistance of the line is below limits determined by the voltage used in making the test.

(f) If no trouble is encountered after it has completed its cycle of tests for a given line, it stops further testing until the contact shoe is moved to the next line; and if a defect is indicated by any one of the tests, it locks up on that test and does not make other tests for that line.

Operation of the set does not require any detailed knowledge of the test set or of the subscriber's line circuit. Consequently the testing operations may be performed by nontechnical and relatively unskilled personnel.

The invention may be more fully understood from the following description when read in connection with the accompanying drawing, the single figure of which illustrates a preferred form of the invention.

GENERAL DESCRIPTION OF TESTING APPARATUS

The test set is provided with a contact shoe indicated by the dotted line rectangle SH in the lower right-hand corner of the drawing. This contact shoe is provided with three contacts, $s$, $r$ and $t$, which make contact respectively with the sleeve, ring and tip terminals of successive lines to be tested as the operator moves the shoe manually along the terminal block of a distributing frame.

Two relays BY and ST are associated with the sleeve contacts of the shoe. Relay BY operates when a busy line is encountered, and to cause the pass-by lamp BYL to glow, and to operate a buzzer BZR. The relay BY also disconnects ground from other parts of the set to prevent interference with the busy line by the test set.

If the line is not busy the relay ST operates and remains operated until the series of tests have been completed. The operation of the relay ST institutes a series of three tests: (a) a test of the leakage resistance between the tip conductor of the line and ground; (b) a test of the leakage resistance between the ring and ground; and (c) a test of the leakage resistance between the two wires of the line.

A slow operating relay SR is controlled by the relay ST and is energized four successive times in making a complete cycle of tests. The first time the relay SR is energized and then released it conditions the circuit to make the tip-to-ground test. During this test it is re-operated and if a fault is detected by the test it is locked up to stop further testing of the faulty line. If no fault is discovered it is released to start the ring-to-ground test. It is operated for the third time during this test and is released to initiate the final tip-to-ring test if no fault is discovered on the second test. During the final test it is operated for the fourth time and locks up the circuit regardless of whether or not the third test discloses a fault.

The relay SR controls two switching relays $SO_1$ and $SO_2$, each of which is slow to operate and slow to release. It is through these relays, which control corresponding test relays $T_1$ and $T_2$, that the relay SR successively conditions the testing circuit to make the tip-to-ground, ring-to-ground and tip-to-ring tests above referred to. The circuit is so arranged that when the test relay $T_1$ is operated alone a tip-to-ground test is made, and when the relay $T_2$ alone is operated a ring-to-ground test is made. When, however, both relays are operated simultaneously, a tip-to-ring test is made. The timing of all of these tests is the same and is determined by the operating time required for the various relays, as will appear more fully hereinafter.

A common test relay $T_3$ is provided and has associated therewith a test battery whose voltage is determined in accordance with the requirements of the tests to be made. This relay $T_3$ and test battery are connected between the tip and ground for the first test, between the ring and ground for the second test, and between the tip and ring for the third test. If the leakage resistance is above the minimum allowable on a given test, the relay $T_3$ will not operate, and the relay SR will function to cause the circuit to be conditioned for the succeeding test. This will continue until all three tests have been completed.

If, on any one of the tests the leakage resistance is below the allowable minimum, the relay $T_3$ will operate and cause the ground lamp GND to glow in the case of a tip-to-ground or ring-to-ground test. In the case of a tip-to-ring test, it will cause the shunt lamp SHT to glow. In each case, the buzzer BZR, if provided, is actuated. At the same time the circuit is locked up to prevent further tests and a lamp TST is caused to glow. When this lamp glows simultaneously with the ground lamp or the shunt lamp, the operator will be informed that a defective condition has been found. The lamp TST is also arranged so that it will glow at the beginning of the test to indicate when each test is initiated. When all three tests have been completed the lamp TST glows again to indicate that fact.

As already stated the testing circuit is locked up and no further tests are made, if in testing a given line any one of the three tests shows a defect. This simplifies the operation and makes it unnecessary for the attendant to perform further operations in order to continue the tests. It is unnecessary to make further tests when a given test shows up a defective condition. This is because determination of the fact that one defect exists makes it necessary to send a maintenance man out to check the insulation of the line, and where defective, repair it. Proper repair of the line of course eliminates any other insulation faults that may exist.

OPERATION OF TEST CIRCUIT WHEN LINE TO BE TESTED IS BUSY

Further details of the apparatus will be understood in connection with a description of the operation, which is as follows: As the attendant moves the shoe SH along the terminal block of the distributing frame, the terminals $s$, $r$ and $t$ of the block make contact with the sleeve, ring and tip terminals of a line. If the line is busy, the sleeve terminal of the line will be grounded. If the line is not busy, a different condition will exist. For example, its sleeve conductor may have applied thereto voltage from a 48-volt battery through a cut-off relay. It will be noted that the windings of the relays BY and ST are normally connected in series in circuit with a 24-volt battery. These relays are so designed that neither relay will be operated when both are in series with each other and with the 24-volt battery. However, if the sleeve contact $s$ is grounded, as is the case where a tested line is busy, the circuit from the 24-volt battery through the winding of the relay BY direct to ground has lower resistance than when the relays BY and ST are in series in the same circuit. Consequently the relay BY is operated.

On being operated, the pass-by relay BY opens its contact 2 and disconnects ground from the armature of the start relay ST to prevent any of the other relays of the circuit from being operated. This precludes any accidental connection between the tip or ring conductor of the line and any of the internal wiring of the set. At its contact 1, relay BY connects ground to a circuit passing through the pass-by lamp BYL and through the relay BZ to battery. The lamp BYL glows and the relay BZ causes the buzzer BZR to operate to apprize the operator that the line is busy, and the test shoe should be moved on to the next line.

OPERATION OF TEST CIRCUIT WHEN LINE TO BE TESTED IS IDLE (a) Testing leakage from tip of line to ground If the test shoe SH encounters an idle line the 48-volt battery connected to the sleeve conductor $s$ of the line opposes the smaller current normally flowing through the relay BY and prevents false operation of that relay. At the same time the battery on the sleeve increases the flow of current through the winding of the start relay ST to ground. The relay ST is therefore operated and remains operated so long as the sleeve conductor $s$ remains in contact with the sleeve of the idle line. By connecting the shoe to an idle line the ground through the winding of the relay ST of the test circuit is connected over the sleeve contact $s$ to the sleeve conductor of the line being tested. This ground makes the line under test appear busy to all other calls.

The relay ST, upon being operated, closes the circuit at its contact 1 from ground over contact 2 of relay BY, contact 1 of relay ST, contacts 1—2 of relay $SO_2$, contacts 1—2 of relay $SO_1$, and through the winding of slow release relay SR, to battery. Relay SR now operates and at its contacts 2—3 completes a circuit to operate the relay $SO_1$ and to cause the test lamp TST to glow. This circuit extends from ground over contact 2 of relay BY, contact 1 of relay ST, over conductor $x$, over contacts 2—3 of relay SR to terminal 10, and thence in parallel through the lamp TST to grounded battery, and over contacts 8b—7b of relay $T_1$ through the winding of relay $SO_1$, to battery. The glowing of the lamp TST at this time informs the operator that the line is not busy and that the tests of the line are about to proceed.

The relay $SO_1$ is slow to operate, but after a brief interval it pulls up its armature and opens its contacts 1—2, thereby opening the circuit of the relay SR. At its contacts 3—4, relay $SO_1$ prepares a circuit to operate the relay $T_1$ in the manner which will appear presently.

The relay SR being slow to release, does not permit its armature to fall off immediately, but after a brief interval it opens its contacts 2—3 and closes its contacts 2—1. Upon opening its contacts 2—3, the lamp TST ceases to glow, and the circuit through the winding of the relay $SO_1$ is broken. The relay $SO_1$ does not fall off immediately, however, as it is slow to release.

When the relay SR opens its contacts 2—3, it also closes its contacts 2—1. Relay SO₁, however, has not yet released its armature, and therefore, for an interval determined by the slowness of the relay SO₁ to release, the contacts 3—4 of said relay are closed concurrently with contacts 2—1 of relay SR. During this interval a circuit to operate the test relay T₁ is completed from battery through the lower winding of said relay, over contacts 4—3 of relay SO₁, contacts 1—2 of relay SR, over conductor x, and over contact 1 of relay ST and contact 2 of relay BY to ground. This circuit remains closed until relay SO₁ releases.

In the meantime, relay T₁ operates and closes a locking circuit from battery through its upper winding, over its contacts 1t—2t, over conductor y, over contacts 1t—2t of deenergized relay T₂, and thence over contact 1 of relay ST and contact 2 of relay BY to ground. Relay T₁, by opening its contacts 8b—7b and closing its contacts 8b—6b, shifts the operating connection controlled by the relay SR from the relay SO₁ to the relay SO₂. The latter relay, however, is not operated at this time, as the circuit is opened at contacts 2—3 of the relay SR.

Relay T₁, by closing its contacts 4b—5b, completes a test circuit from the tip conductor of the line under test, over contact t of the test shoe SH, over the tip conductor t' of the test set, through a 1000-ohm resistance, over contacts 4b—5b of relay T₁, over conductor m, over contacts 4b—5b of relay T₂, through the upper winding of test relay T₃, through the test battery B, through the second winding of relay T₃, and over contacts 2b—1b of relay T₂ to ground.

When this test circuit is completed, two conditions may occur: (a) The resistance leakage to ground from the tip conductor of the line being tested may be below normal, thereby indicating a defect, or (b) said leakage resistance may be above the minimum limit, indicating a normal condition. Assuming first that the leakage resistance is below normal, the current flow through the windings of the relay T₃ will be large enough to cause the operation of said relay. Relay T₃, by closing its contacts 9—4, completes a circuit from ground over said contacts, over contacts 8t—6t—5t of relay T₂, over conductor o, through the ground lamp GND, and through the winding of the relay BZ to battery. The ground lamp GND therefore glows and the relay BZ causes the buzzer BZR to operate to apprize the person conducting the test that a defective condition has been encountered. Relay T₃, by closing its contacts 9—4, also completes another circuit from ground over said contacts, normal contacts 8t—6t of relay T₂, over conductor p, closed contacts 7t—5t of relay T₁, and through the winding of the relay LO to battery.

The operation of the relay LO locks up the circuit and stops further tests in the following manner: It will be recalled that relay SR released its armature and operated the relay T₁ over the contacts 3—4 of the relay SO₁ and that relay T₁ in turn opened the circuit of the relay SO₁. Upon having its circuit opened relay SO₁, after a slight delay, releases its armature. At its contacts 1—2 relay SO₁ again completes the circuit of the relay SR, which is once more energized. Relay SR, upon re-operation, locks up over its contacts 4—5 and over the contacts 3—2 of the now operated relay LO. Relay SR therefore remains locked up and operated until the circuit is restored by shifting the contact s of the shoe from the sleeve terminal of the line being tested.

Relay SR, upon being energized and locked up, closes a circuit over its contacts 2—3 to operate the lamp TST and the relay SO₂. The circuit of the latter was prepared by the operation of the relay T₁, which closed its contacts 8b—6b and opened its normal contacts 8b—7b, thus substituting the connection to the relay SO₂ for the previous connection to the relay SO₁ as already described. The circuit for operating the lamp TST and the relay SO₂ extends from ground over contact 2 of relay BY, over contact 1 of relay ST, over conductor x, over contacts 2—3 of relay SR to point 10, from which point the circuit proceeds in parallel through the lamp TST to battery, and over contacts 8b—6b and through the winding of the relay SO₂ to battery. The operation of the relay SO₂ has no significance at this time, but the lamp TST now glows in unison with the previously operated ground lamp GND to apprize the operator that a faulty condition in the insulation has been found upon the tip-to-ground test of the line.

The circuit remains locked up in this condition until the operator, after having recorded the fault in his log, moves the shoe to the next line, thereby breaking the operating connection for the relay ST at the sleeve contact s of the shoe, and at the same time breaking the connection of the test relay T₃ at the tip contact t of the shoe. Relay ST in falling off opens at its contact 1 the operating circuit of the relay SR. Relay T₃ in opening its contacts 4—9, opens the circuit of the relay LO, which in turn opens the locking circuit of the relay SR. Relay T₃, by opening its contacts 4—9, also opens the circuit of the ground lamp GND and the buzzer relay BZ. Relay SR falls off after its operating and locking circuits have been opened, and thereby opens the circuit of relay SO₂ and the test lamp TST. The relay T₁ is also released because its locking circuit passes over the contacts 1—2 of the relay ST which has just been released.

*(b) Testing leakage from ring conductor of line to ground*

Assuming that on the tip-to-ground test the relay T₃ was not operated because the leakage resistance indicated by that test was above the required minimum, the relay LO would not have been operated and hence no locking circuit would have been provided for the relay SR when it was reoperated as above described upon the release of the relay SO₁. The relay SR upon being reenergized, by closing its contacts 2—3, completes the circuit previously traced to operate the relay SO₂ and cause the lamp TST to glow.

This circuit, it will be remembered, passed over the closed contacts 8b—6b of locked up relay T₁. Due to the fact that the relay SR is not locked up under the conditions above described, it releases its armature after a brief interval, and opens the circuit of the lamp TST and of the relay SO₂, thus extinguishing the lamp. The relay SO₂, however, being slow to release, does not immediately fall off. During the brief interval after the relay SR has released and while the relay SO₂ is still holding up its armature, a circuit is closed to operate relay T₂ from ground over contact 2 of relay BY, contact 1 of relay ST, over conductor x, over contacts 2—1 of relay SR, over contacts 4—5 of relay SO₂, and through the lower winding of relay T₂ to battery.

Relay T₂, upon being energized, opens its contacts 1t—2t and thereby breaks the locking circuit of the relay T₁, which is at once released. Relay T₂, by closing its contacts 3t—2t, locks up through its upper winding to ground over contact 1 of relay ST and contact 2 of relay BY.

Relay T₂ at its contacts 2b—3b completes a ring-to-ground test circuit from the ring contact r of the test shoe, over conductor r' through a 1000-ohm resistance, over contacts 3b—2b of locked up relay T₂, through the middle winding of relay T₃, through battery B, through the upper winding of relay T₃, over contacts 5b—6b of relay T₂, over conductor n, and to ground over contacts 2b—1b of relay T₁, which it will be recalled is at this time released.

As in the case of the tip-to-ground test, the result of this ring-to-ground test will depend upon whether the leakage resistance of the line is greater than or less than the minimum allowable value. Let us assume first that it is less than the allowable value, as will be the case when the insulation condition of the ring conductor of the line is abnormal due to moisture entering cracks, or other defects of the insulation.

Under these conditions the relay T₃ operates and establishes a connection from ground over its contacts 9—4, over contacts 8t—9t of relay T₂, over conductor w, and thence over contacts 4t—3t of relay T₁, through the ground lamp GND and the winding of the buzzer relay BZ, to battery. The ground lamp and the buzzer BZR are thereby actuated. At the same time the circuit for the relay LO is closed from ground over contacts 9—4 of relay T₃, over contacts 8t—9t of relay T₂, over conductor w, over contacts 4t—6t of relay T₁, through the winding of the relay LO to battery. Relay LO therefore provides a locking circuit over its contacts 2—3 for the relay SR when it is operated for the third time.

This occurs as a result of the relay T₂ being operated as above described. Relay T₂ upon being operated opens at its contacts 2t—1t, the locking circuit of the relay T₁. Relay T₁ in turn, by opening its contacts 8b—6b, opens the circuit of the relay SO₂ and prepares a path over contacts 8b—7b for the relay SO₁. When the relay SO₂ releases after its circuit has been opened as above described, it again closes at its contacts 1—2 the energizing circuit of the relay SR. The relay SR, upon being thus energized for the third time, is locked up over its contacts 4—5 and over contacts 3—2 of now operated relay LO.

Relay SR upon being energized for the third time as above set forth, completes a circuit over its contacts 2—3 to operate the lamp TST and to re-operate the relay SO₁. This circuit extends from ground over contact 2 of relay BY, over contact 1 of relay ST, over conductor x, over contacts 2—3 of relay SR to point 10, and thence in parallel through the lamp TST to battery, and over contacts 8b—7b of deenergized relay T₁ through the winding of relay SO₁ to battery. The operation of the relay SO₁ is without significance at this time, but lamp TST is caused to glow simultaneously with the ground lamp GND, indicating to the operator that an abnormal condition of the insulation of the line is indicated by the ring-to-ground test. The circuit remains thus locked up until released by moving the shoe to the next line. So long as the shoe remains associated with the line being tested, no further tests will be made because the relay SR is locked up.

The operator, upon recording the fact that a fault was found on the line, moves the shoe to the next line, thereby opening the connection to the test circuit over the sleeve contact s of the shoe and also the connection over the ring contact r of the shoe. The opening of the sleeve contact connection releases relay ST and in turn opens the initial energizing circuit of the relay SR and the locking circuit of the relay T₂, thereby restoring the latter. The opening of the circuit from the ring contact r of the shoe causes the relay T₃ to release, thereby opening the circuits of the ground lamp GND, of the buzzer relay BZ, and of the relay LO. The latter, in falling off, unlocks the relay SR, which, upon being released, opens at its contacts 2—3 the energizing circuit for the test lamp TST and the relay SO₁. The testing circuit is now in normal condition.

(c) *Testing leakage resistance from tip to ring of the line*

Let us assume now that the test circuit, after having made the tip-to-ground test without finding a line fault, and having thereafter operated the relay T₂ to make the ring-to-ground test, finds the ring-to-ground leakage resistance above normal. As a consequence, the relay T₃ will not be energized when the test circuit from the ring contact r to ground over contacts of the relay T₂ is completed, as previously described. The result is that the circuits of the ground lamp GND, the buzzer relay BZ and the relay LO are not completed in the manner previously described. Consequently, the circuit of the relay SR will not be locked up when it is operated for the third time by the release of relay SO₂ in the manner above described.

Upon the third operation of relay SR it closes a circuit previously described over its contacts 2—3 to operate lamp TST and relay SO₁. Relay SO₁ at its contacts 1—2 opens the circuit of relay SR, which after a slight delay, releases. When the relay SR is thus released upon the operation of the relay SO₁, a momentary circuit is closed over contacts 1 and 2 of the relay SR to operate the relay T₁, the said circuit extending from ground over contact 2 of relay BY, over contact 1 of relay ST, over conductor x, contacts 2—1 of relay SR, contacts 3—4 of relay SO₁, and through the lower winding of relay T₁ to battery. Relay T₁ now operates and locks up through its upper winding over its contacts 1t—2t, over conductor y, over contacts 6—7 of relay SO₂ (which is released at this time), through the winding of relay T₁', over contacts 4t—3t—2t of relay T₂, and thence to ground over contact 1 of relay ST and contact 2 of relay BY.

Relay T₂ remains locked up at this time over its contacts 3t—2t, as previously described. Consequently, both relays T₁ and T₂ are now locked up. The relay T₁' is also operated over the locking path of the relay T₁ as above described, and upon closing its contact 1, both relays T₁ and T₁' are locked up over a circuit from battery through the upper winding of the relay T₁, over contacts 1t—2t of said relay, over contact 1 of relay T₁', through the winding of relay T₁', and thence over a circuit previously traced through contacts 4t—3t—2t of relay T₂ to ground.

Relay T₁ upon being operated, prepares a path over its contacts 8b—6b to operate the relay SO₂ for the second time, and by opening its contacts 8b—7b, relay T₁ opens the previously described circuit of the relay SO₁. Relay SO₁, upon releasing, again closes the operating circuit of the relay SR over contacts 2—1 of relay SO₁. Relay SR, upon being thus energized for the fourth time, closes a circuit to operate the lamp TST in parallel with the relay SO2, said circuit extending over a path previously traced from ground over the contact of relay BY, over conductor $x$ and over contacts 2—3 of relay SR to point 10. From this point the circuit extends in parallel through the lamp TST to battery and over contacts 8b—6b of relay T1 through the winding of relay SO2 to battery.

The lamp TST, therefore, glows for the fourth time to indicate to the operator that the tip-to-ring test is being made in a manner to be described later. The relay SO2, upon being operated, closes at its contacts 2—3 a locking circuit from the relay SR from battery through the winding of said relay, over contacts 2—1 of relay SO1, over contacts 2—3 of relay SO2, over contacts 7b—8b of locked up relay T2, over contacts 1t—2t of now operated and locked up relay T1, over contact 1 of relay T1', through the winding of relay T1', over contacts 4t—3t—2t of relay T2, over contact 1 of relay ST, and over contact 2 of relay BY to ground. This locking circuit is independent of the relay LO and hence holds the relay SR locked up with the lamp TST glowing regardless of whether the tip-to-ring test detects a fault or not.

We now have a condition under which both relays T1 and T2 have been energized and locked up. Under these conditions, a test circuit involving the tip and ring conductors of the line can be traced from the tip contact $t$ of the shoe over conductor $t'$, over contacts 4b—5b of relay T1, over contacts 3b—2b of said relay T1, over conductor $n$, over contacts 6b—5b of relay T2, through the upper winding of relay T3, through battery B, through the middle winding of relay T3, over contacts 2b—3b of relay T2, and thence over conductor $r'$ to the ring contact $r$ of the test shoe.

If, however, the leakage resistance of the line between ring and sleeve is below normal, the relay T3 will be operated to close its contacts 9—4. This extends a ground connection over said contacts, over contacts 8t—9t of relay T2, over conductor $w$, over contacts 4t—5t of relay T1, and thence through the shunt lamp SHT and the buzzer relay BZ to battery. Under these conditions, the buzzer relay BZ operates and the shunt lamp SHT glows simultaneously with the test lamp TST, indicating that a fault has been found.

The operation of the relay T3 also closes the circuit for the relay LO from ground over contacts 9—4 of relay T3, over contacts 8t—9t of relay T2, over conductor $w$, over contacts 4t—5t of relay T1, over conductor $u$, over contacts 7t—6t of relay T2, over conductor $p$, over contacts 7t—6t of relay T1, and thence through the winding of the relay LO to battery. The relay LO is thereby operated, but its operation at this time is without significance because a locking circuit for the relay SR already exists over a circuit previously traced via contacts 2—3 of relay SO2.

The operator, having noted the fault indicated by the simultaneous glowing of the lamps TST and SHT, moves the test shoe to the next line, thereby opening the connections established from the sleeve contact $s$ to the relay ST, and from the tip contact $t$ through the winding of the relay T3 to the ring contact $r$. The relay ST is therefore released and opens the locking circuits of relays T2, T1', T1 and SR. The relay SR, in falling off, opens the circuits previously traced for the lamp TST and the relay SO2, which are restored to normal. The relay T3, upon being released, opens the test circuit previously traced and also opens the circuit of the relay LO. The buzzer relay BZ and relay LO now fall off, and the entire circuit is restored to normal.

If the tip-to-ring leakage resistance of the line is above the required minimum, the relay T3 is not operated by the above circuit, and the circuit remains in the condition above described with the test lamp TST glowing alone. This indicates to the operator that the test has been completed and that no fault has been found on any one of the three tests made and he moves the test shoe SH to the next line to be tested.

While this invention has been disclosed in certain specific arrangements which are deemed desirable, it will be obvious that the general principles herein set forth may be embodied in many other organizations, widely different from those illustrated, without departing from the spirit of the invention as defined in the appended claims.

What is claimed is:

1. In a test circuit for ascertaining abnormal-leakage conditions on a line, means to make tip-to-ground, ring-to-ground, and tip-to-ring leakage resistance tests in a predetermined successive order, said means including an abnormal leakage detector, two test relays, one when operated alone associating said detector with a test connection from the tip of a line being tested to ground, the other when operated alone associating said detector with a test connection from the ring of said line to ground, and means whereby when both relays are operated, said detector is associated with a test connection from the tip to the ring of said line.

2. In a test circuit for ascertaining abnormal leakage conditions on a line, means to make tip-to-ground, ring-to-ground, and tip-to-ring leakage resistance tests in a predetermined successive order, said means including an abnormal leakage detector, two test relays, one when operated alone associating said detector with a test connection from the tip of a line being tested to ground, the other when operated alone associating said detector with a test connection from the ring of said line to ground, means whereby when both relays are operated said detector is associated with a test connection from the tip to the ring of said line, and means acting at different times to operate each of said relays alone, and at another time to operate both relays simultaneously.

3. In a test circuit for ascertaining abnormal leakage conditions on a line, means to make tip-to-ground, ring-to-ground, and tip-to-ring leakage resistance tests in a predetermined successive order, said means including an abnormal leakage detector, two test relays, one when operated alone associating said detector with a test connection from the tip of a line being tested to ground, the other when operated alone associating said detector with a test connection from the ring of said line to ground, means whereby when both relays are operated said detector is associated with a test connection from the tip to the ring of said line, and means acting at different times to operate each of said relays alone for equal intervals and to operate both relays simultaneously for an interval of the same length.

4. In a test circuit for ascertaining abnormal leakage conditions on a line, means to make tip-to-ground, ring-to-ground, and tip-to-ring leakage resistance tests in a predetermined successive order, said means including an abnormal leakage detector, two test relays, one when operated alone associating said detector with a test connection from the tip of a line being tested to ground, the other when operated alone associating said detector with a test connection from the ring of said line to ground, means whereby when both relays are operated said detector is associated with a test connection from the tip to the ring of said line, means acting at different times to operate each of said relays alone for equal intervals and to operate both relays simultaneously for an interval of the same length, a signal responsive when an abnormal leakage is detected with only one of said relays operated and another signal responsive when abnormal leakage is detected with both relays operated.

5. In a test circuit for ascertaining abnormal leakage conditions on a line, means to make tip-to-ground, ring-to-ground, and tip-to-ring leakage resistance tests in a predetermined successive order, said means including an abnormal leakage detector, two test relays, one when operated alone associating said detector with a test connection from the tip of a line being tested to ground, the other when operated alone associating said detector with a test connection from the ring of said line to ground, means whereby when both relays are operated said detector is associated with a test connection from the tip to the ring of said line, and a controlling relay operating at successive intervals when the test circuit is associated with an idle line to cause in a predetermined order operations of each of said relays alone and of both relays simultaneously.

6. In a test circuit for ascertaining abnormal leakage conditions on a line, means to make tip-to-ground, ring-to-ground, and tip-to-ring leakage resistance tests in a predetermined successive order, said means including an abnormal leakage detector, two test relays, one when operated alone associating said detector with a test connection from the tip of a line being tested to ground, the other when operated alone associating said detector with a test connection from the ring of said line to ground, means whereby when both relays are operated said detector is associated with a test connection from the tip to the ring of said line, and a controlling relay operating at successive equal timed intervals when the test circuit is associated with an idle line to cause in a predetermined order operations of each of said relays alone and of both relays simultaneously.

7. In a test circuit for ascertaining abnormal leakage conditions on a line, means to make tip-to-ground, ring-to-ground, and tip-to-ring leakage resistance tests in a predetermined successive order, said means including an abnormal leakage detector, two test relays, one when operated alone associating said detector with a test connection from the tip of a line being tested to ground, the other when operated alone associating said detector with a test connection from the ring of said line to ground, means whereby when both relays are operated said detector is associated with a test connection from the tip to the ring of said line, a controlling relay operating at successive intervals when the test circuit is associated with an idle line to cause in a predetermined order operations of each of said relays alone and of both relays simultaneously, and means to stop further operations of said controlling relay while the test circuit is associated with a given line if an abnormal leakage condition is detected during any one of said test connections.

CLAUDE M. ROSS.